Oct. 3, 1967
E. A. BRYANT
3,345,477
DECELERATION AND STOP LIGHT SIGNALLING
EQUIPMENT FOR MOTOR VEHICLES
Filed Sept. 1, 1965
2 Sheets-Sheet 1
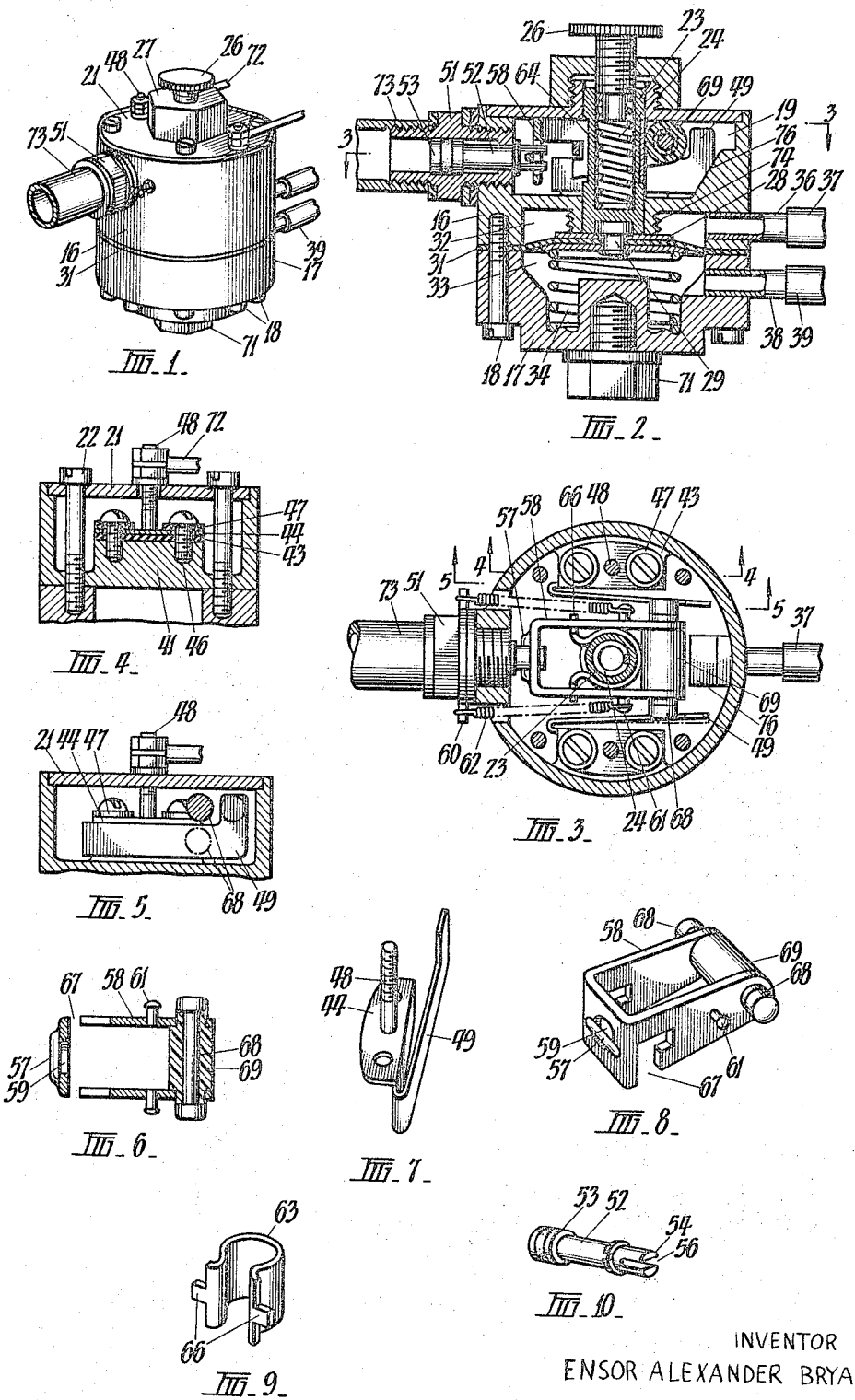
INVENTOR
ENSOR ALEXANDER BRYANT
By: Silverman & Cass
Attorneys

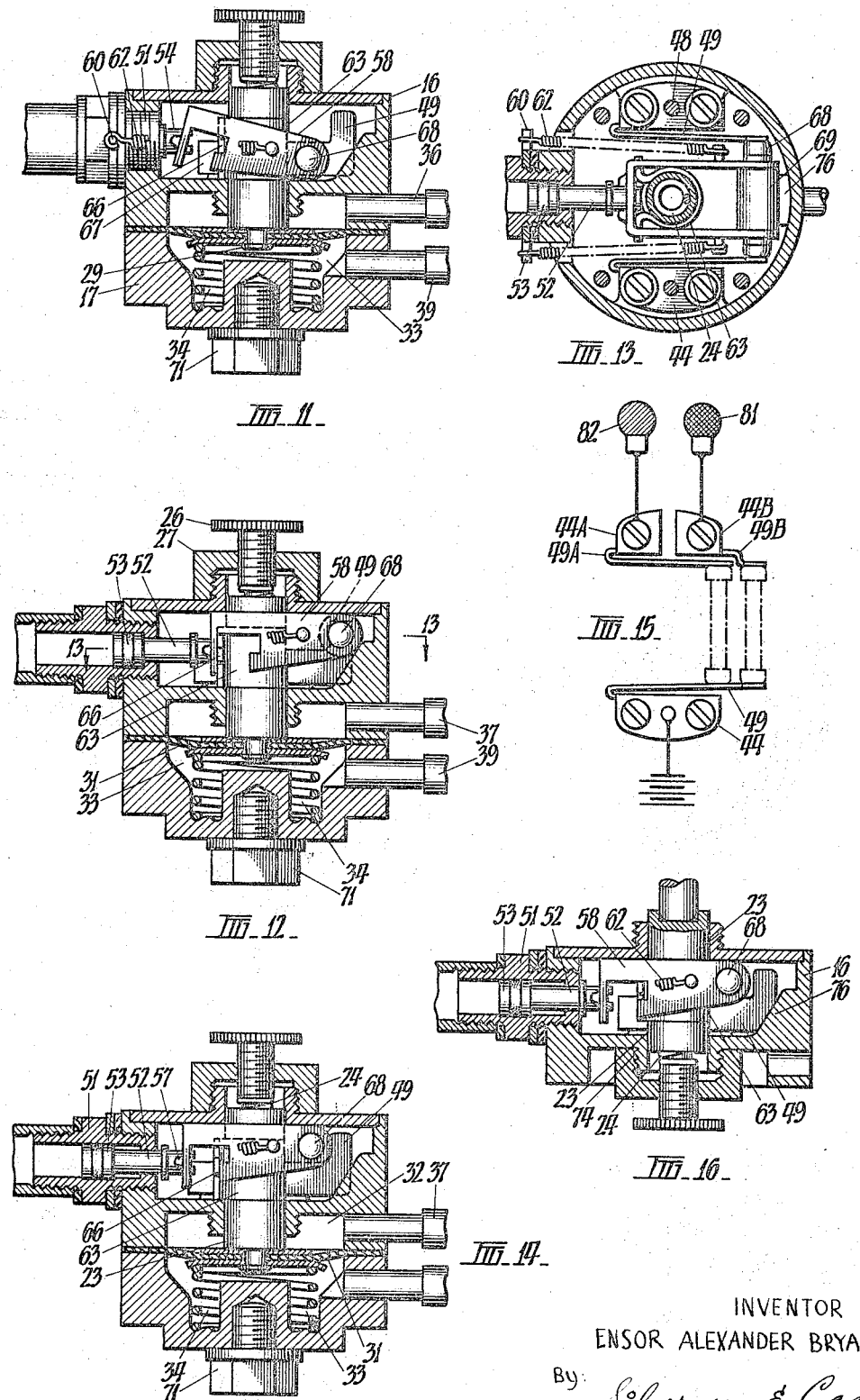

United States Patent Office 3,345,477
Patented Oct. 3, 1967

3,345,477
DECELERATION AND STOP LIGHT SIGNALLING EQUIPMENT FOR MOTOR VEHICLES
Ensor A. Bryant, 4 Wimmera Ave., Manifold Heights, Geelong, Victoria, Australia
Filed Sept. 1, 1965, Ser. No. 484,292
Claims priority, application Australia, Sept. 2, 1964, 48,896/64
20 Claims. (Cl. 200—81.5)

ABSTRACT OF THE DISCLOSURE

A switch having two plungers slidably mounted in transverse relation to each other within the switch body and each having biasing means. An electrical contact member mounted in the switch body the electrical contact member being able to move between a first and a second position by one of the two plungers and able to move to a third position by the second plunger regardless of the position of the electrical contact member prior to the second plunger being activated.

---

This invention relates to equipment for controlling rear vehicle warning lights for the purpose of signalling to the drivers of following motor vehicles that the vehicle to which the equipment is fitted is about to reduce speed and is concerned particularly with switches for such equipment.

At the present time it is standard practice to fit motor vehicles with stop lights which are operable by the driver's brake pedal, or by a rise in pressure of the hydraulic brake system consequent upon movement of the driver's brake pedal, so that the stop lights are illuminated when the driver begins to apply the brakes. However, stop lights which are operable in this manner do not give any indication of the driver's intention to stop until he has moved the brake pedal. An earlier indication of the driver's intention is very desirable in order to given adequate warning to the drivers of following vehicles and thereby to reduce the danger of multiple collisions which are caused by the driver of each succeeding vehicle having a shorter time and smaller distance in which to apply his brakes.

It has presently been proposed to give this earlier indication by means of stop light devices operable upon the release of the driver's accelerator pedal. However, most such known devices give ambiguous indications, and in particular they continue to give a warning signal when the vehicle is stationary after having been halted by the brakes or when the vehicle is accelerating slowly after a period of deceleration. The specification of my copending U.S. patent application 127,358 discloses equipment which gives a more reliable indication of the driver's intention to decelerate. This equipment includes a switch having a pair of contacts which are closed when the driver's accelerating pedal is released and which are reset in an open condition either when the accelerator pedal is depressed once more or the brake pedal is operated, whichever is the earlier. Such a switch must be used in conjunction with a conventional brake-operated switch and the two switches connected in a circuit such that operation of either of them will cause illumination of a rear warning light on the vehicle. It is an object of this invention to provide an improved switch which allows the second switch to be dispensed with.

It is a further object of the invention to provide a switch in which "sparking" at the contacts thereof is reduced to a minimum.

According to the invention there is provided a switch comprising a body, an electrical contact member mounted on the body so as to be movable between first, second and third positions, first actuating means normally operatively connected to the electrical contact member so as to be actuable to move that member between the first and second positions, and second actuating means actuable to disrupt the operative connection between the first actuating means and the electrical contact member and also to move the electrical contact member to the third position whether that member be in the first or second position before the actuation of the second actuating means.

In order that the invention may be more fully explained a preferred embodiment thereof will now be described in detail with reference to the accompanying drawings in which:

FIGURE 1 is a perspective view of a switch according to the invention,

FIGURE 2 is a longitudinal cross-section of the switch illustrated in FIGURE 1,

FIGURE 3 is a section approximately on the line 3—3 in FIGURE 2,

FIGURE 4 is a section on the line 4—4 in FIGURE 3,

FIGURE 5 is a section on the line 5—5 in FIGURE 3,

FIGURE 6 is a sectional view of a yoke and electrical contact assembly incorporated in the switch, FIGURE 7 is a perspective view of a combined electrical contact blade and terminal post incorporated in the switch, FIGURE 8 is a perspective view of the yoke and contact assembly illustrated in FIGURE 6, FIGURE 9 is a perspective view of a collar incorporated in the switch, FIGURE 10 is a perspective view of a piston incorporated in the switch and which engages the yoke and moving contact assembly illustrated in FIGURES 6 and 8, FIGURES 11 and 12 are longitudinal cross-sections of the switch corresponding to FIGURE 2 but which show the switch in two different operational conditions, FIGURE 13 is a section on the line 13—13 in FIGURE 12, FIGURE 14 is a further longitudinal cross-section of the switch corresponding to FIGURE 2 but showing the switch in yet a further operational condition, FIGURE 15 is a diagrammatic representation of a manner in which the switch illustrated in FIGURES 1 to 14 can be modified for a purpose to be explained hereinafter, and FIGURE 16 is a longitudinal cross-section of a further form of switch according to the invention.

The switch illustrated in FIGURES 1 to 14 comprises a pair of die-cast body members 16, 17 which are clamped together by means of clamping screws 18. Body member 16 has an upper cavity 19 which is closed by a cover plate 21 clamped to body member 16 by screws 22. Cover plate 21 and body member 16 have central bores in which a plunger 23 is slidably mounted. Plunger 23 is bored out to receive a helical compression spring 24 the upper end of which abuts against an adjusting screw 26 mounted in a threaded hole in a nut 27 which is screwed on to a threaded boss 25 on cover plate 21.

Spring 24 biasses plunger 23 downwardly against a diaphragm holder 28. Diaphragm holder 28 comprises a pair of discs and a stud 29 the upper part of which fits into a recess in the bottom of plunger 23. A circular flexible diaphragm 31 is mounted on holder 28 and is clamped at its outer edge between body members 16, 17 to divide a cavity formed by those two members into a pair of chambers 32, 33. Diaphragm holder 28 is biassed upwardly by a helical compression spring 34 which is much stiffer than spring 24. A tube connector 36 is provided in body member 16 to allow the connection of a tube 37 to chamber 32 and a similar connector 38 is provided in body member 17 to allow the connection of a tube 39 to chamber 33.

A pair of lands 41 are cast integrally in body portion 16 to project from the floor of cavity 19 at opposite sides of that cavity. A pair of insulating plates 43 are laid on these lands and a pair of electrically conducting members 44 are held in position by screws 46. Members 44 are insulated from body member 16 by plates 43 and a pair of insulating washers 47. These members comprise a pair of terminal posts 48 wihch extend upwardly through openings in cover plate 21 and a pair of contact blades 49.

A hollow spigot 51 is screwed into body member 16 and carries a plunger 52 comprising a piston 53 and a stem 54 which projects into cavity 19. A groove 56 is cut in the end of stem 54 and this groove receives a pivot pin 57 which is fixed to a yoke 58 to extend across an opening 59 therein. A pair of transverse pegs 61 are fixed to the yoke and a pair of tension springs 62 are fastened between these pegs and a pair of transverse pegs 60 on spigot 51 to bias the yoke towards spigot 51.

A collar 63 is seated in a circumferential groove 64 in plunger 23. The ends of this collar are turned out and shaped so as to define a pair of nibs 66 which project transversely of yoke 58 and engage a pair of inverted L-shaped notches 67 formed therein. Yoke 58 carries a transversely extending electrically conducting member 68 which is insulated from the yoke by a sleeve 69 of insulating material and which serves, in a manner to be hereinafter explained, as a movable bridge member which can bridge contact blades 49.

A mounting stud 71 screws into a threaded opening in the bottom of body member 17. In use, the switch is clamped to a drilled bracket by means of clamping studs 71 at any convenient location on a motor vehicle and terminal posts 48 are connected in a simple series circuit with the battery of the vehicle and the rear warning lights by means of leads 72. An hydraulic conduit 73 is connected between spigot 51 and the hydraulic brake system of the vehicle so that the pressure of the hydraulic fluid in the braking system is applied to piston 53. Tube 39 is connected to the in-take manifold of the vehicle engine between the throttle or butterfly valve and the engine cylinders and tube 37 is connected to the induction passage of the engine carburettor on the upstream side of the throttle or butterfly valve. Thus chamber 33 is subjected at all times to the partial vacuum condition in the engine inlet manifold. When the throttle or butterfly valve is in an open condition, a partial vacuum will also be produced in chamber 32 due to the Venturi action the air flowing rapidly through the carburettor intake passage and across the end of tube 37. This partial vacuum in chamber 32 will depend on the throttle setting, but it will approximate that in the inlet manifold and chamber 33 a wide range of "open" settings. If, however, the throttle is closed, the flow of air through the carburettor will be greatly reduced so that there will be very little Venturi action and chamber 32 will be subjected to almost full atmospheric pressure.

FIGURE 2 illustrates the condition of the switch when the vehicle is accelerating or travelling steadily with the throttle open. In these circumstances chambers 32 and 33 are both subjected to partial vacuums and any forces acting on diaphragm 19 are not sufficient to overcome the action of spring 34 which forces diaphragm holder upwardly against a boss 74 in body member 16 and so holds plunger 23 upwardly against the action of spring 24. Nibs 66 of collar 63 then engage the horizontal legs of notches 67 in yoke 58 and hold the yoke in a position in which bridge member 68 is held clear of contact blades 49. The stop light circuit is then open and the stop lights inoperative.

If the throttle of the engine is now closed, chamber 32 will be suddenly subjected to almost full atmospheric pressure whereas chamber 33 will remain subject to full engine intake vacuum. This vacuum is sufficient to cause diaphragm 19 to move downwardly against the action of spring 34. Plunger 23 and collar 63 move downwardly with the diaphragm and the engagement of nibs 66 with the horizontal legs of slot 67 causes yoke 58 to pivot downwardly about pivot pin 57. Bridge member 68 then engages contact blades 49. The ends of bridge member 68 are rounded so that it firstly forces blades 49 apart and then moves between them with a wiping action until the switch is in the condition illustrated in FIGURE 11. Bridge 68 is then bridging contact blades 49 and the warning light switch is closed so that the warning lights at the rear of the vehicle are illuminated.

If the driver re-opens the throttle without applying the brakes, the partial vacuum produced again in chamber 32 decreases the downward forces on diaphragm 19 and spring 34 will raise the diaphragm and plunger 23. Nibs 66 will then move yoke 58 and bridge member 68 back to the position shown in FIGURE 2. If, however, the brake pedal is operated the rise of hydraulic pressure in the brake system acts on piston 52 to move plunger 52 inwardly with respect to cavity 19. This in turn moves yoke 58 so that sleeve 69 engages a ramp 76, which is cast integrally in body portion 16 to project from the floor of cavity 19, causing yoke 58 to pivot upwardly about pivot pin 57. The switch thereby assumes the condition illustrated in FIGURE 12. During the translation and upward pivoting of yoke 58 consequent to the application of the vehicle brakes, bridge member 68 remains in wiping contact with contact blades 49 since these blades are turned upwardly at their ends. If the brake is now released pressure is removed from piston 53 and spring 62 draw yoke 58 and plunger 52 to the position shown in FIGURE 14. Since immediately the brake is released the throttle is still closed, nibs 66 are too low to register with the horizontal legs of slots 67 and they therefore prevent yoke 58 and plunger 52 from being retracted completely by springs 62. However when the throttle is opened once more, plunger 23 and collar 63 will be lifted, allowing nibs 66 to register with the horizontal legs of slots 67, and yoke 58 and plunger 52 will snap back into the position shown in FIGURE 2.

In the manner described immediately above, the application of the vehicle brakes sets the switch in such a condition that it will return to an "open circuit" condition when the brakes are released even through the throttle is still closed. The switch cannot subsequently respond to the throttle setting until the throttle has been opened to accelerate the vehicle to the speed at which diaphragm 31 will lift. The compression of spring 24 can be varied by means of adjusting screw 26 in order to adjust the switch to suit the intake vacuum characteristics of the vehicle motor. If the warning light is illuminated before the throttle is closed, the compression of spring 24 must be decreased whereas if the light is not illuminated even when the throttle is fully closed the compression of spring 24 should be increased. The switch may simply be installed in a vehicle in place of the stop-light switch conventionally provided. The spreading and wiping action of the blade contacts reduces "sparking" at those contacts, and consequent pitting thereof, to a minimum.

FIGURE 15 illustrates a manner in which the above described switch may be modified to provide two separate warning signals, e.g. the illumination of an amber light on release of the accelerator and the illumination of a red light on application of the brakes. As in FIGURE 15, this may be achieved by forming one of conducting members 44 in two pieces 44A and 44B electrically insulated from one another, piece 44B having a blade portion 49B corresponding to the upturned part of the one-piece blade and being electrically connected to the red warning light 81 and piece 44A having a blade portion 49A which is engaged by the bridge member only when the engine throttle is closed and the vehicle brakes are inoperative and which are electrically connected to the amber warning light 82. The amber warning light could, of course, be replaced by a red light of lower intensity than the one illuminated by operation of the brakes.

FIGURE 16 illustrates an alternative form of switch according to the invention. This switch has been designed for mechanical connection to the throttle linkage of the vehicle so that it is operated mechanically upon release of the accelerator rather than by the induction vacuum of the engine. It comprises components which are identical to some of the components of the switch illustrated in FIGURES 1 to 14 and these components have been identified by the same reference numerals. These components are body portion 16, cover plate 21, threaded spigot 51, plunger 52, yoke 58, springs 62, bridge member 68, and conducting members 44. Plunger 23, together with collar 63, spring 24, adjusting screw 26 and nut 27 are merely turned end for end and nut 27 is screwed on to boss 74 of body member 16. In use of this switch, spigot 51 is connected to the brake system as before but the upper end of plunger 23 is connected mechanically to the accelerator linkage so that it is pushed downwardly when the accelerator approaches the idling position. The switch is connected electrically between the vehicle battery and a rear stop light as before and it will be readily appreciated that it will provide the same signals as the switch described previously.

The above-described switches according to the invention are exemplary only and many modifications and adaptations may be made thereto to suit various applications. For example, the switch illustrated in FIGURES 1 to 14 is designed for connection to the intake system of a vehicle engine in such a manner that diaphragm 31 is moved according to a pressure differential between the engine inlet manifold and the carburettor intake passage. This arrangement gives a very positive movement. However, with many engines a satisfactory movement can be achieved solely in response to variations in the engine intake vacuum and in such cases tube connector 36 could be dispensed with. It is accordingly to be understood that the invention is in no way limited to the above-described embodiments but includes all constructions falling within the scope of the claims appended hereto.

I claim:

1. A switch comprising a body, an electrical contact member mounted in the body so as to be movable between first, second and third positions, first actuating means coupled to the electrical contact member so as to be actuable to move that member between the first and second positions, and second actuating means actuable to disrupt the coupling between the first actuating means and the electrical contact member and to move the electrical contact member to the third position regardless of the position of that member immediately prior to the actuation of the second actuating means.

2. A switch comprising a body, a first plunger slidably mounted in the body, a second plunger slidably mounted in the body transversely of the first plunger, a bracket pivotally mounted on the second plunger, a slot in said bracket, a projection on the first plunger which engages said slot, an electrical contact member attached to said bracket, first biassing means which biases the first plunger in one direction, and second biassing means which biases said bracket and said second plunger in a second direction transverse to said one direction, wherein normally the action of the first and second biassing means holds the bracket in such a position that the electrical contact member is in a first position and the engagement of said projection with said slot is such that actuation of the first plunger against the action of the first biassing means causes the bracket to pivot and move the electrical contact member to a second position but actuation of the second plunger against the action of the second biassing means causes the bracket to move transversely of the first plunger to render the engagement of said projection with said slot inoperative and to move the electrical contact member to a third position.

3. A switch comprising a body, a first plunger slidable in the body, a second plunger slidable in the body transversely of the first plunger, a bracket pivotally mounted on said second plunger, a slot having two mutually perpendicular legs in said bracket, a projection on the first plunger which engages said slot, an electrical contact member on said bracket, first biassing means which biases said first plunger in one direction and second biassing means which biases said bracket and said second plunger in a second direction transverse to said one direction, wherein normally the action of the first and second biassing means holds the bracket in such a position that the electrical contact member is in a first position and said projection engages one of the legs of said slot in such a manner that actuation of the first plunger against the action of the biassing means causes the bracket to pivot and move the electrical contact member to a second position but actuation of the second plunger against the action of the second biassing means causes the bracket to move transversely of the first plunger such that said projection moves into inoperative engagement with the other of the legs of the slot and the electrical contact member is moved to a third position.

4. A switch comprising a body, a first plunger slidable in the body, a second plunger slidable in the body transversely of the first plunger, a bracket pivotally mounted on the second plunger, an electrical contact attached to said bracket, a slot in said bracket, a projection on the first plunger which engages said slot, a guide surface on said body, first biassing means which biases the first plunger in one direction, and second biassing means which biases said electrical contact member and said second plunger in a second direction transverse to said one direction, wherein normally the action of the first and second biassing means holds said assembly in such a position that the electrical contact member is in a first position and the engagement of said projection with said slot is such that actuation of the first plunger against the action of the first biassing means causes the bracket to pivot and move the electrical contact member to a second position but actuation of the second plunger against the action of the second biassing means causes the bracket to move transversely of the first plunger to render the engagement of said projection with said slot inoperative and to move the electrical contact member to a third position, the movement of the contact member to the third position in the case where the contact member was in the second position immediately prior to the actuation of the second plunger resulting from a pivoting motion of said assembly caused by engagement of that assembly with said guide surface.

5. A switch as claimed in claim 2, in which the bracket is substantially channel-shaped and has a pair of flanges which extend transversely of the first plunger one on each side thereof and the electrical contact member is mounted across the flanges.

6. A switch comprising a body, a first plunger slidable in the body, a second plunger slidable in the body transversely of the first plunger, a bracket and electrical contact assembly which comprises a generally channel-shaped bracket having a pair of flanges which extend transversely of the first plunger one on each side thereof and an electrical contact member mounted across the flanges, a pair of slots in the flanges of said channel-shaped bracket, a pair of projections on the first plunger which engage said slots, a guide surface on said body, first biassing means which biases the first plunger in one direction, and second biassing means which biases said assembly and said second plunger in a second direction transverse to said one direction, wherein normally the action of the first and second biassing means holds said assembly in such a position that the electrical contact member is in a first position and the engagement of said projections with said slots is such that actuation of the first plunger against the action of the first biassing means causes the bracket to pivot and move the electrical contact member to a second position but actuation of the second plunger against the action of the second biasing means causes the bracket to move transversely of the first plunger to render the engagement of said projections with said slots inoperative and to move the electrical contact member to a third position, the movement of the contact member to the third position in the case where the contact member was in the second position immediately prior to the actuation of the second plunger resulting from a pivoting motion of said plunger caused by engagement of that assembly with said guide surface.

7. A switch comprising a body, an electrical contact member mounted in the body so as to be movable between first, second and third positions, first actuating means coupled to the electrical contact member so as to move that member between the first and second positions, second actuating means to disrupt the coupling between the first actuating means and the electrical contact member and to move the electrical contact member to the third position regardless of the position of that member immediately prior to the actuation of the second actuating means, and a pair of electrically conducting elements spaced from one another in the body, wherein said elements are electrically separated from one another when the electrical contact member is in the first position but are bridged by the electrical contact member when that member is in the second and third position.

8. A switch as claimed in claim 7, wherein the electrically conducting elements are also bridged by the electrical contact member when the electrical contact member is in the third position.

9. A switch as claimed in claim 8, wherein the electrically conducting elements are so shaped that they remain bridged by the electrical contact member when that member is moving from the second to the third position.

10. A switch as claimed in claim 7, in which the electrically conducting elements comprise resilient blades and are bridged by engagement of the blades with the electrical contact member in such a manner that the blades are forced apart.

11. A switch as claimed in claim 7, in which the said pair of electrically conducting elements are electrically separated when the electrical contact member is in the third position but a further electrically conducting element is provided and said further element and one of said pair of electrically conducting elements are bridged by the electrical contact member when that member is in the third position.

12. A switch comprising a body, a first plunger slidable in the body, a second plunger slidable in the body transversely of the first plunger, a bracket pivotally mounted on the second plunger, a slot in said bracket, a projection on the first plunger which engages said slot, an electrical contact member on said bracket, first biasing means which biases the first plunger in one direction, second biasing means which biases said bracket and said second plunger in a second direction transverse to said one direction, and a pair of electrically conducting elements spaced from one another in the body, wherein normally the action of the first and second biasing means holds the bracket in such a position that the electrical contact member is in a first position and out of engagement with said electrically conducting elements which are then electrically separated from one another and the engagement of said projection with said slot is such that actuation of the first plunger against the action of the first biasing means causes the bracket to pivot and move the electrical contact member to a second position in which it bridges said pair of electrically conducting elements but actuation of the second plunger against the action of the second biassing means causes the bracket to move transversely of the first plunger to render the engagement of said projection with said slot inoperative and to move the electrical contact member to a third position.

13. A switch as claimed in claim 12, in which said pair of electrically conducting elements are also bridged by the electrical contact member when the electrical contact member is in the third position.

14. A switch as claimed in claim 13, in which the said electrically conducting elements are so shaped that they remain bridged by the electrical contact member when that member is moving from the second to the third position.

15. A switch as claimed in claim 12, in which said pair of electrically conducting elements are electrically separated when the electrical contact member is in the third position but a further electrically conducting element is provided and said further element and one of said pair of electrically conducting elements are bridged by the electrical contact member when that member is in the third position.

16. A switch as claimed in claim 2, in which a flexible diaphragm is mounted on the first plunger and connected to the body to define a chamber in the body such that the first plunger can be actuated against the action of the first biassing means by reducing the pressure in the chamber.

17. A switch as claimed in claim 16, in which the first biassing means is a compression spring located within the chamber and acting on the diaphragm.

18. In stop light signalling equipment for a motor vehicle comprising an electric circuit controlling the illumination of a vehicle warning light, a switch comprising a body, a pair of electrically conducting elements spaced from one another in the body and connected in said circuit, an electrical contact member mounted in the body so as to be movable between first, second and third positions, first actuating means actuable on release of the accelerator of the vehicle and normally operatively connected to the electrical contact member so that its actuation causes the electrical contact member to move from the first position to the second position in which latter position it bridges said pair of electrically conducting elements to close said circuit and thereby cause illumination of the stop light, and second actuating means actuable by application of the brakes of the vehicles to move the electrical contact member to the third position and to disrupt the operative connection between the first actuating means and the electrical contact member.

19. Stop light signalling equipment as claimed in claim 18, in which the electrically conducting elements are also bridged by the electrical contact member when the electrical contact member is in the third position so that the circuit is also closed and the said warning light illuminated when the brakes of the vehicle are applied.

20. Stop light signalling equipment as claimed in claim 18, wherein said pair of electrically conducting elements are electrically separated when the electrical contact member is in the third position so that the warning light is not illuminated when the brakes of the vehicle are applied but wherein the switch comprises a further electrically conducting element which is connected in a circuit with a further warning light which circuit is closed by the electrical contact member when in the third position so that the further warning light is illuminated when the brakes of the vehicle are applied.

References Cited
UNITED STATES PATENTS

| | | | |
|---|---|---|---|
| Re. 23,719 | 10/1953 | Coombs | 340—66 |
| 2,131,264 | 9/1938 | Benjamin | 123—146.5 |
| 2,899,516 | 8/1959 | Smith | 200—131 |

BERNARD A. GILHEANY, *Primary Examiner.*

H. B. GILSON, *Assistant Examiner.*